United States Patent
Nishio et al.

(10) Patent No.: US 12,205,597 B2
(45) Date of Patent: Jan. 21, 2025

(54) VOICE PROCESSING SYSTEM AND VOICE PROCESSING METHOD

(71) Applicant: SHARP KABUSHIKI KAISHA, Sakai (JP)

(72) Inventors: Tatsuya Nishio, Sakai (JP); Fumiaki Sugimori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 290 days.

(21) Appl. No.: 17/740,005

(22) Filed: May 9, 2022

(65) Prior Publication Data

US 2022/0383878 A1    Dec. 1, 2022

(30) Foreign Application Priority Data

May 26, 2021    (JP) .................................. 2021-088380

(51) Int. Cl.
| | | |
|---|---|---|
| *G10L 15/28* | (2013.01) | |
| *G10L 15/20* | (2006.01) | |
| *H04R 1/40* | (2006.01) | |
| *H04R 5/033* | (2006.01) | |

(52) U.S. Cl.
CPC .............. *G10L 15/28* (2013.01); *G10L 15/20* (2013.01); *H04R 1/406* (2013.01); *H04R 5/0335* (2013.01); *H04R 2201/107* (2013.01)

(58) Field of Classification Search
CPC ......... G10L 15/28; G10L 15/20; G10L 17/00; H04R 1/406; H04R 5/0335; H04R 2201/107; H04R 3/005; H04R 1/1041; H04R 5/033; H04S 7/307; G06F 3/167

See application file for complete search history.

(56) References Cited

U.S. PATENT DOCUMENTS

| | | | | |
|---|---|---|---|---|
| 8,185,387 | B1 * | 5/2012 | Lachapelle | ............. G10L 21/02 |
| | | | | 379/88.19 |
| 2015/0301796 | A1 * | 10/2015 | Visser | ..................... G10L 17/22 |
| | | | | 715/728 |
| 2017/0010674 | A1 * | 1/2017 | Ide | ...................... H04W 12/065 |
| 2018/0286407 | A1 * | 10/2018 | Katoh | ................... G10L 15/083 |
| 2021/0400142 | A1 * | 12/2021 | Jorasch | .............. H04L 65/1069 |
| 2021/0407532 | A1 * | 12/2021 | Salahuddin | .......... A61B 5/6803 |

FOREIGN PATENT DOCUMENTS

| | | |
|---|---|---|
| JP | 2000-101690 A | 4/2000 |
| JP | 2020-042292 A | 3/2020 |
| WO | WO-2021095832 A1 * 5/2021 | ............. H04R 1/028 |

OTHER PUBLICATIONS

WO2021095832A1—Translation (Year: 2020).*

* cited by examiner

*Primary Examiner* — Bhavesh M Mehta
*Assistant Examiner* — Darioush Agahi
(74) *Attorney, Agent, or Firm* — ScienBiziP, P.C.

(57) ABSTRACT

A voice processing system includes: a first acquisition processor that acquires voice data corrected by a microphone installed in a microphone-speaker device; a second acquisition processor that acquires authentication information of a wearer who wears the microphone-speaker device, the authentication information being acquired by an authentication information acquirer installed in the microphone-speaker device; and a control processor that executes predetermined processing related to the voice data, which is acquired by the first acquisition processor, on the basis of the authentication information acquired by the second acquisition processor.

15 Claims, 8 Drawing Sheets

CONFERENCE INFORMATION

| CONFERENCE ID | VENUE | STARTING DATE AND TIME | ENDING DATE AND TIME | PARTICIPANT | MATERIAL |
|---|---|---|---|---|---|
| M001 | R1,R2 | ts1 | te1 | A~D | F001 |
| ... | ... | ... | ... | ... | ... |

USER INFORMATION

| USER ID | VOICE INFORMATION | FINGERPRINT INFORMATION |
|---|---|---|
| 0001 | Va | Fa |
| 0002 | Vb | Fb |
| 0003 | Vc | Fc |
| 0004 | Vd | Fd |
| 0005 | Ve | Fe |
| 0006 | Vf | Ff |
| 0007 | Vg | Fg |
| ... | ... | ... |

FIG. 6

| SETTING INFORMATION | | | |
|---|---|---|---|
| USER ID | VOLUME INFORMATION | GAIN INFORMATION | EQUALIZER INFORMATION |
| 0001 | V1 | G1 | E1 |
| 0002 | V2 | G2 | E2 |
| 0003 | V3 | G3 | E3 |
| 0004 | V4 | G4 | E4 |
| 0005 | V5 | G5 | E5 |
| 0006 | V6 | G6 | E6 |
| 0007 | V7 | G7 | E6 |
| ... | ... | ... | ... |

VOICE PROCESSING SYSTEM AND VOICE PROCESSING METHOD

INCORPORATION BY REFERENCE

This application is based upon and claims the benefit of priority from the corresponding Japanese Patent Application No. 2021-088380 filed on May 26, 2021, the entire contents of which are incorporated herein by reference.

BACKGROUND

The present disclosure relates to a voice processing system and a voice processing method for exchanging voice between microphone-speaker devices.

Conventionally, a voice processing system capable of exchanging voice data of a user's speech has been known.

For example, such a system has been known that executes preliminary processing on input voice information to facilitate identification processing, executes predetermined processing on the preliminary processed voice information, executes task processing on the basis of first information, modifies the first information when evaluation of the task processing is not satisfactory, and repeats a series of the processing until the evaluation becomes satisfactory, so as to optimize the voice information.

Such a system has also been known that includes: a transmitter that converts an input voice signal into a transmittable signal and transmits such a signal; an external storage medium that stores voice information of a particular person; a speaker recognition device that uses the input voice signal and the voice information stored in the external storage medium to determine whether the input is from the particular person; and a main CPU that controls transmission output by the transmitter on the basis of a detection result by the speaker recognition device.

By the way, a wearable microphone-speaker device that includes a microphone and a speaker and can be worn around the user's neck has been known. This microphone-speaker device can acquire and transmit a wearer's speech to another microphone-speaker device, and can output voice received from the other microphone-speaker device to the wearer. Here, when having acquired ambient noise such as speech made by another user who is located near the wearer, the microphone-speaker device possibly transmits the speech as the noise to the other microphone-speaker device. This causes a problem of degrading convenience of the microphone-speaker device, such as uncomfortable feeling by another user and unsmooth conversation using the microphone-speaker device.

SUMMARY

The present disclosure has a purpose of providing a voice processing system and a voice processing method capable of improving convenience of a wearable microphone-speaker device worn by a user.

A voice processing system according to an aspect of the present disclosure is a voice processing system that exchanges voice data of a user's speech via a wearable microphone-speaker device worn by the user, and includes: a first acquisition processor that acquires the voice data collected by a microphone installed in the microphone-speaker device; a second acquisition processor that acquires authentication information of a wearer who wears the microphone-speaker device, the authentication information being acquired by an authentication information acquirer installed in the microphone-speaker device; and a control processor that executes predetermined processing related to the voice data, which is acquired by the first acquisition processor, on the basis of the authentication information acquired by the second acquisition processor.

A voice processing method according to another aspect of the present disclosure is a voice processing method for exchanging voice data of a user's speech via a wearable microphone-speaker device worn by the user, and causes one or plural processors to: acquire the voice data that is collected by a microphone installed in the microphone-speaker device; acquire authentication information of a wearer who wears the microphone-speaker device, the authentication information being acquired by an authentication information acquirer installed in the microphone-speaker device; and execute predetermined processing related to the acquired voice data on the basis of the acquired authentication information.

According to the present disclosure, it is possible to improve convenience of the wearable microphone-speaker device worn by the user.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a table illustrating an example of conference information used by the conference system according to the embodiment of the present disclosure.

FIG. 5 is a table illustrating an example of user information used by the conference system according to the embodiment of the present disclosure.

FIG. 6 is a table illustrating an example of setting information used by the conference system according to the embodiment of the present disclosure.

DETAILED DESCRIPTION

A description will hereinafter be made on an embodiment of the present disclosure with reference to the accompanying drawings. The following embodiment is merely one example that embodies the present disclosure, and does not intend to limit the technical scope of the present disclosure.

A voice processing system according to the present disclosure can be applied to a case where plural users at two sites (for example, conference rooms R1, R2) hold a conference (for example, an online conference or the like) by using microphone-speaker devices, for example. The microphone-speaker device has a neckband shape, for example, and each of the users wears the microphone-speaker device around his/her neck to participate in the conference. Each of the users can hear voice that is output from a speaker in the microphone-speaker device, can use a microphone in the microphone-speaker device to collect his/her speech, and can transmit his/her speech to the other microphone-speaker device. The voice processing system according to the present disclosure can also be applied to a case where the plural users at the single site hold the conference by using the respective microphone-speaker devices. The voice processing system according to the present disclosure can further be applied to a case where the single user uses the microphone-speaker device to have his/her own voice recognized or to interpret a content of his/her speech into another language. A description will hereinafter be made on an embodiment of a conference system as an example of the voice processing system according to the present disclosure.

Conference System 100

Figure 1:
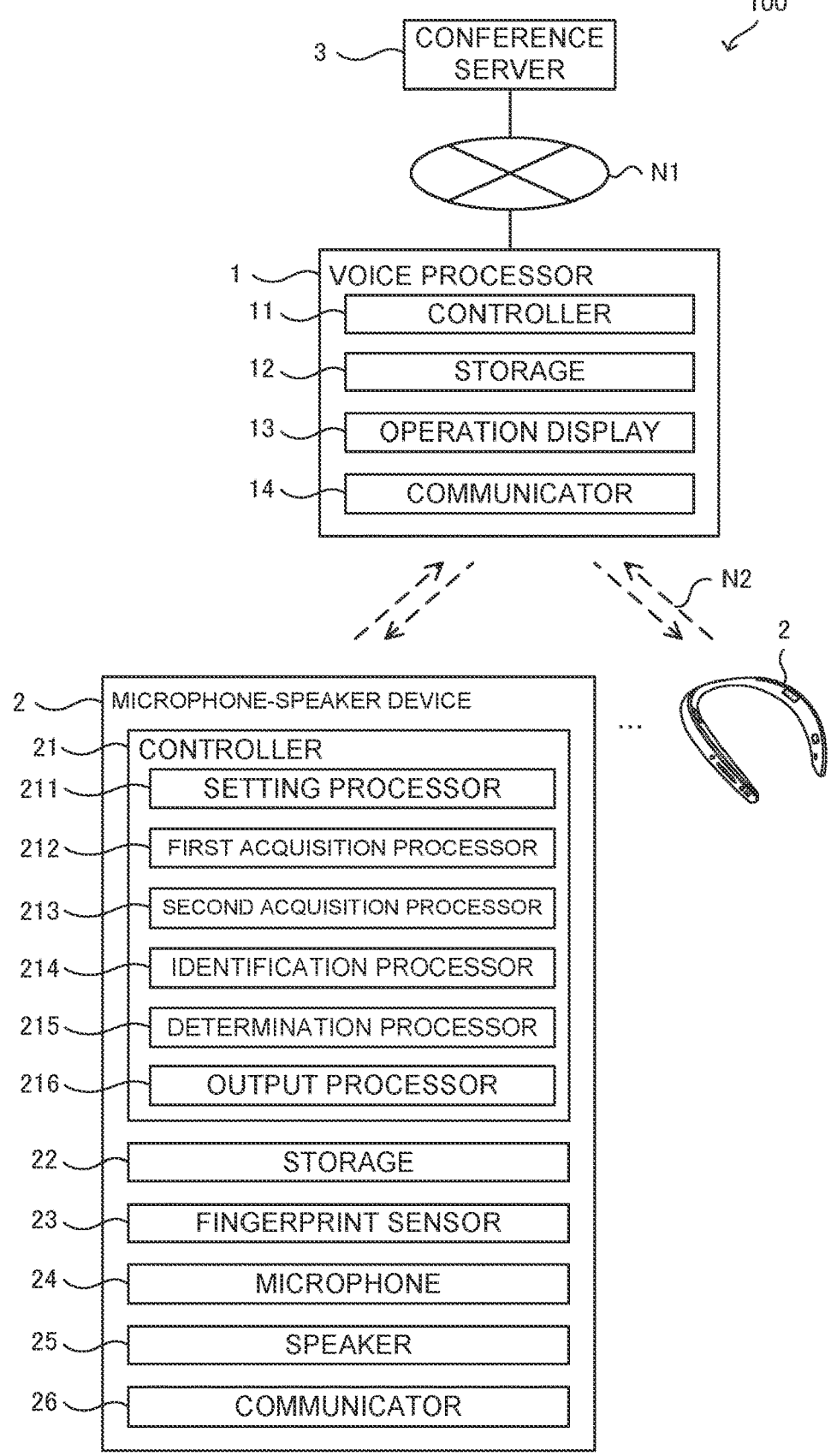
FIG. 1 is a diagram illustrating a configuration of a conference system according to an embodiment of the present disclosure.

FIG. 1 is a diagram illustrating a configuration of the conference system according to the embodiment of the present disclosure. A conference system 100 includes a voice processor 1, plural microphone-speaker devices 2, and a conference server 3. The microphone-speaker device 2 is acoustic equipment in which a microphone 24 and a speaker 25 are installed. The microphone-speaker device 2 may have a function as an AI speaker, a smart speaker, or the like, for example. The conference system 100 is a system that includes the plural wearable microphone-speaker devices 2 worn by the plural users and exchanges voice data of the user's speech among the plural microphone-speaker devices 2. The conference system 100 is an example of the voice processing system in the present disclosure.

The conference server 3 executes a conference application for implementing an online conference. In addition, the conference server 3 manages conference information D1. The voice processor 1 controls each of the microphone-speaker devices 2 and, once the conference is started, executes processing to exchange the voice among the microphone-speaker devices 2. The microphone-speaker device 2 itself may constitute the voice processing system in the present disclosure, or the voice processor 1 itself may constitute the voice processing system in the present disclosure.

Figure 2:
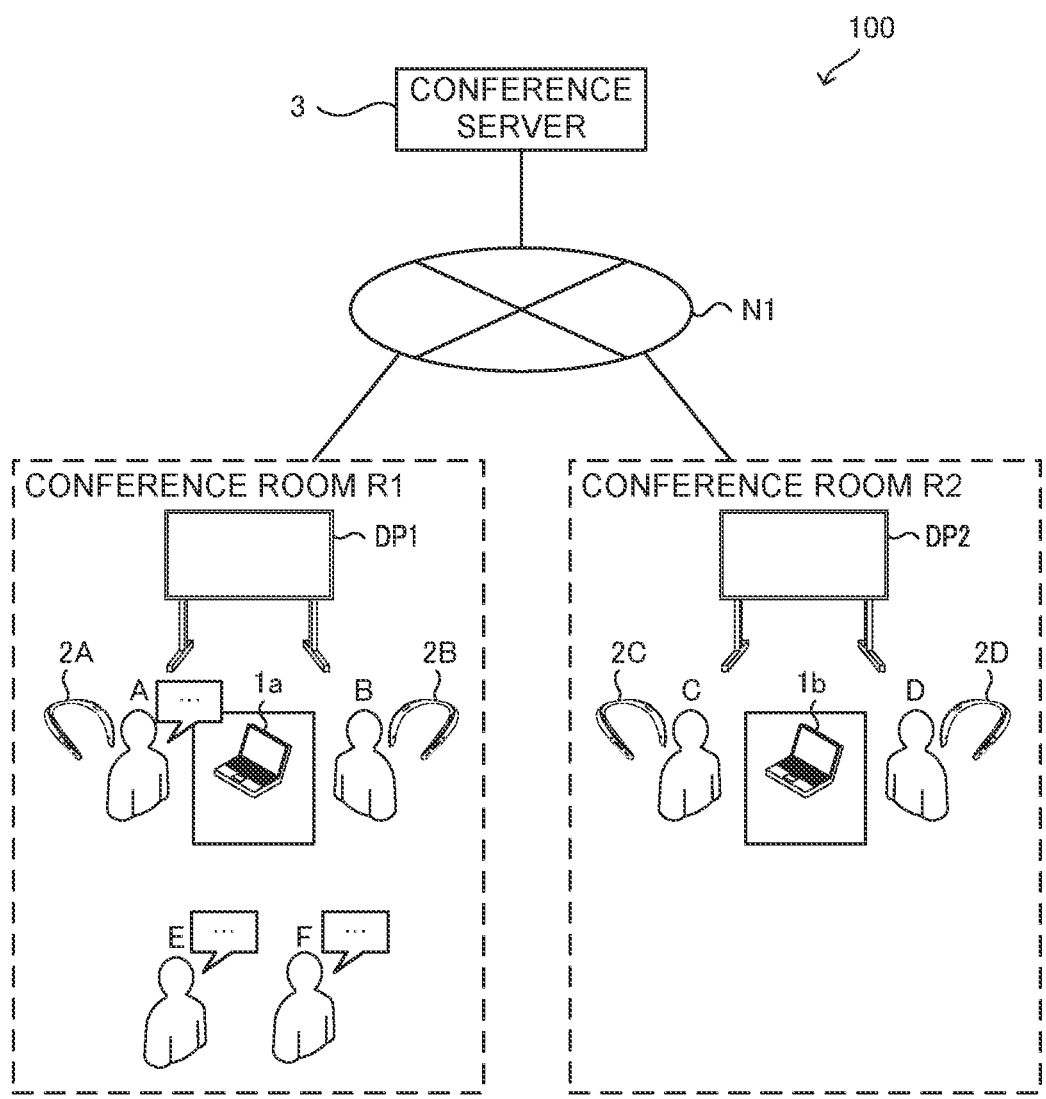
FIG. 2 is a view illustrating an application example of the conference system according to the embodiment of the present disclosure.

A description will be made on the online conference illustrated in FIG. 2 as an example. Of users A to D who are participants of the online conference, the users A, B are located in the conference room R1, and the users C, D are located in the conference room R2. The users A to D respectively wear microphone-speaker devices 2A to 2D around their necks to participate in the conference. In addition, a voice processor 1a and a display DP1 are installed in the conference room R1, and a voice processor 1b and a display DP2 are installed in the conference room R2. The displays DP1, DP2 share screens thereof to show a conference material, for example. A pair of the voice processor 1a and the display DP1 and a pair of the voice processor 1b and the display DP2 are configured to allow data communication with each other via the conference server 3 that is connected to a communication network N1 (for example, the Internet). The voice processors 1a, 1b are information processors having the same functions (for example, personal computers). Hereinafter, each of the voice processors 1a, 1b will be referred to as a "voice processor 1" when a common description thereon will be made.

In this embodiment, it is assumed that users E, F who do not participate in the conference are also located in the conference room R1. None of the users E, F possesses the microphone-speaker device 2.

The conference server 3 is connected to the communication network N1, and exchanges voice data from the conference rooms R1, R2 via the microphone-speaker devices 2 and the voice processors 1a, 1b. For example, when having acquired voice data of the user A's speech from the microphone-speaker device 2A, the voice processor 1a transmits such voice data to the conference server 3. The conference server 3 then transmits the voice data acquired from the voice processor 1a to the voice processors 1a, 1b. The voice processor 1a transmits the voice data acquired from the conference server 3 to the microphone-speaker device 2B of the user B, and causes the microphone-speaker device 2B to output (emit) the user A's speech. Similarly, the voice processor 1b transmits the voice data acquired from the conference server 3 to each of the microphone-speaker devices 2C, 2D of the users C, D, and causes each of the microphone-speaker devices 2C, 2D to output (emit) the user A's speech. In addition, the conference server 3 accepts an operation by the user and shows the conference material and the like on the displays DP1, DP2. In this way, the conference server 3 implements the online conference.

Furthermore, the conference server 3 stores data such as the conference information D1 on the online conference. FIG. 4 illustrates an example of the conference information D1. As illustrated in FIG. 4, the conference information D1 includes, per conference, identification information of the conference (conference ID) and information on a venue of the conference, starting date and time and ending date and time of the conference, the participants of the conference, and the material to be used in the conference. In conference ID "M001", information that corresponds to the online conference illustrated in FIG. 2 is registered. For example, a host of the online conference uses his/her own terminal (personal computer) to register the conference information D1 in advance. The conference server 3 may be a cloud server.

Microphone-Speaker Device 2

Figure 3:
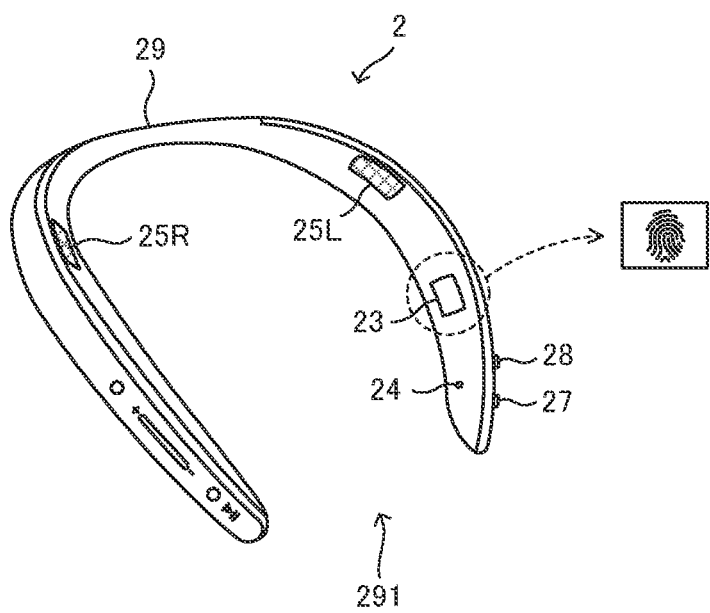
FIG. 3 is an external view illustrating a configuration of a microphone-speaker device according to the embodiment of the present disclosure.

FIG. 3 illustrates an example of external appearance of the microphone-speaker device 2. As illustrated in FIG. 1 and FIG. 3, the microphone-speaker device 2 includes a controller 21, a storage 22, a fingerprint sensor 23, the microphone 24, the speaker 25, a communicator 26, a power supply 27, a connection button 28, and the like. For example, the microphone-speaker device 2 is neckband-type wearable equipment that can be worn around the user's neck. The microphone-speaker device 2 acquires the user's voice through the microphone 24 and outputs the voice to the user from the speaker 25. The microphone-speaker device 2 may include a display that shows various types of information.

As illustrated in FIG. 3, a body 29 of the microphone-speaker device 2 has an annular structure in top view and an opening 291 on a front side when seen from a wearer. In other words, the microphone-speaker device 2 is formed in a U-shape and includes right and left arms when seen from the user who wears the microphone-speaker device 2.

The microphone 24 is arranged on a tip side of the microphone-speaker device 2 so as to easily collect the user's speech. The microphone 24 is connected to a microphone substrate (not illustrated) that is installed in the microphone-speaker device 2. The microphone 24 may be provided to one of the right and left arms, or may be provided to both of the right and left arms.

The speaker 25 includes a speaker 25L arranged in the left arm and a speaker 25R arranged in the right arm when seen from the user who wears the microphone-speaker device 2. Each of the speakers 25L, 25R is arranged near a center of the respective arm of the microphone-speaker device 2 such that the user can easily hear sound output therefrom. The speakers 25L, 25R are connected to a speaker substrate (not illustrated) that is installed the microphone-speaker device 2.

The microphone substrate is a transmitter substrate for transmitting the voice data to the voice processor 1 and is included in the communicator 26. The speaker substrate is a receiver substrate for receiving the voice data from the voice processor 1 and is included in the communicator 26.

The fingerprint sensor 23 is a sensor that reads a fingerprint of the wearer of the microphone-speaker device 2. For example, as illustrated in FIG. 3, the fingerprint sensor 23 is preferably arranged between the microphone 24 and the speaker 25 (for example, the speaker 25L) in the microphone-speaker device 2, and is further preferably arranged on an inner side of the body 29. However, the fingerprint sensor 23 may be arranged on the tip side from the microphone 24 or may be arranged on an upper side or an outer side of the body 29. Just as described, the fingerprint sensor 23 is arranged at a position where the wearer can easily grip the arm of the microphone-speaker device 2. In this way, the user can intuitively acknowledge the position of the fingerprint sensor 23 when having his/her fingerprint read. Accordingly, authentication processing can promptly be executed. In addition, since the fingerprint sensor 23 is arranged on the inner side of the body 29, the user can easily touch the fingerprint sensor 23 with his/her thumb, and thus the fingerprint sensor 23 can easily read the user's thumbprint. The fingerprint sensor 23 is preferably formed in such a shape that the user can easily check the arrangement position thereof (for example, an uneven shape, a finger shape, or the like). In this way, the user can easily acknowledge the position of the fingerprint sensor 23 through sensation by his/her finger. The fingerprint sensor 23 is an example of the authentication information acquirer in the present disclosure. The fingerprint information is an example of the authentication information in the present disclosure. The authentication information acquirer in the present disclosure may be constructed of a camera, and the camera may capture an image of the fingerprint. The fingerprint sensor 23 transmits the read fingerprint information to the controller 21. The controller 21 executes the authentication processing on the basis of the fingerprint information, and notifies the user of an authentication result.

The communicator 26 is a communication interface for executing wireless data communication in accordance with a predetermined communication protocol between the microphone-speaker device 2 and the voice processor 1. More specifically, the communicator 26 is connected to and communicates with the microphone-speaker device 2 by a Bluetooth® method, for example. For example, when the user turns on the power supply 27 and thereafter presses the connection button 28, the communicator 26 executes pairing processing to connect the microphone-speaker device 2 to the voice processor 1. A transmitter may be arranged between the microphone-speaker device 2 and the voice processor 1. In this case, the transmitter may be paired with the microphone-speaker device 2 (Bluetooth connection), and the transmitter and the voice processor 1 may be connected via the Internet.

The storage 22 is a non-volatile storage, such as a hard disk drive (HDD) or a solid state drive (SSD), that stores various types of information. More specifically, the storage 22 stores data such as user information D2 of the user who uses the microphone-speaker device 2.

FIG. 5 illustrates an example of the user information D2. As illustrated in FIG. 5, the user information D2 includes, per user, information such as "USER ID", "VOICE INFORMATION", and "FINGERPRINT INFORMATION". The user ID is identification information of the user. The voice information is information on a voice characteristic with which the user can be identified (for example, voiceprint information). The fingerprint information is information on the fingerprint with which the user can be identified. The voice information and the fingerprint information are examples of the authentication information in the present disclosure.

For example, before using the microphone-speaker device 2, each of the users performs an operation to register his/her voice and fingerprint on the microphone-speaker device 2. More specifically, after pressing a user registration button (not illustrated) on the microphone-speaker device 2, the user speaks a predetermined word or any word for a certain period. In this way, the controller 21 acquires voice information on the voice characteristic from the user's speech. Next, when the controller 21 plays an announcement to urge the user to register his/her fingerprint, the user touches the fingerprint sensor 23 with his/her finger. In this way, the controller 21 acquires the fingerprint information of the user. The controller 21 associates the acquired voice information and the acquired fingerprint information with the appropriately set user ID, and registers these types of the information in the user information D2.

When each of the users performs the registration operation, the user information D2 of the plural users is registered in advance in the storage 22 of the microphone-speaker device 2. Alternatively, each of the users may perform the registration operation to register the user information D2 in the storage 22 of the respective microphone-speaker device 2, or data on the user information D2 may be transferred to each of the plural microphone-speaker devices 2 and stored in respective one of the storages 22.

The storage 22 also stores a control program such as a conference support program for causing the controller 21 to execute conference support processing (see FIG. 8), which will be described below. For example, the conference support program may be recorded in a non-transitory manner on a computer-readable recording medium such as a CD or a DVD, read by a reader (not illustrated) such as a CD drive or a DVD drive provided to the microphone-speaker device 2, and then stored in the storage 22.

The controller 21 includes control devices such as a CPU, ROM, and RAM. The CPU is a processor that executes various types of calculation processing. The ROM is a non-volatile storage that stores, in advance, control programs such as BIOS and OS to cause the CPU to execute the various types of the calculation processing. The RAM is a volatile or non-volatile storage that stores various types of information, and is used as transitory storage memory (a working area) for various types of processing that are executed by the CPU. The controller 21 causes the CPU to execute the various control programs, which are stored in advance in the ROM or the storage 22, and thereby controls the microphone-speaker device 2.

By the way, when having acquired ambient noise such as speech made by another user who is located near the wearer, the microphone-speaker device 2 possibly transmits the speech as the noise to the other microphone-speaker device 2. This causes a problem of degrading convenience of the microphone-speaker device 2, such as uncomfortable feeling by the other user and unsmooth conversation using the microphone-speaker device 2. On the contrary, according to the microphone-speaker device 2 of this embodiment, it is possible to improve the convenience of the microphone-speaker device 2 as follows.

More specifically, as illustrated in FIG. 1, the controller 21 includes various processors such as a setting processor 211, a first acquisition processor 212, a second acquisition processor 213, an identification processor 214, a determination processor 215, and an output processor 216. The controller 21 functions as the various processors by causing the CPU to execute the various types of the processing according to the control programs. Some or all of the processors may be constructed of an electronic circuit. The control program may be a program that causes each processor to function as one of the processors described above.

The setting processor 211 makes settings for the microphone-speaker device 2. More specifically, when the microphone-speaker device 2 is connected to (paired with) the voice processor 1, the setting processor 211 sets volume and a microphone gain according to the operation by the user. The setting processor 211 is an example of the setting processor in the present disclosure.

As another embodiment, the setting processor 211 may automatically set the volume, the microphone gain, an equalizer, and the like on the basis of the authentication information of the user. In this case, the storage 22 may store setting information D3, for example. FIG. 6 illustrates an example of the setting information D3.

As illustrated in FIG. 6, the setting information D3 includes, per user, information such as "USER ID", "VOLUME INFORMATION", "GAIN INFORMATION", and "EQUALIZER INFORMATION". The user ID is the identification information of the user. The volume information is information on a set value that indicates volume of the sound output from the speaker 25. The gain information is information on a set value that indicates a gain of the microphone 24. The equalizer information is information on a frequency characteristic of a voice signal.

For example, after registering the voice information and the fingerprint information in the microphone-speaker device 2, each of the users performs an operation to register his/her preferred volume, microphone gain, and frequency characteristic. More specifically, the user presses the user registration button (not illustrated) on the microphone-speaker device 2, and operates an operation switch provided to the microphone-speaker device 2 to adjust his/her preferred volume, microphone gain, and frequency characteristic. When having acquired the set values of the volume, the microphone gain, and the frequency characteristic, the controller 21 associates the set values with the user ID, which is associated with the fingerprint information, and then registers these types of the information in the setting information D3. The controller 21 associates the user ID (see FIG. 5), which is associated with the voice information and the fingerprint information, with the user ID in the setting information D3 (see FIG. 6), and then registers the user ID.

When the microphone-speaker device 2 is connected to (paired with) the voice processor 1 and acquires the user's fingerprint or voice, the setting processor 211 refers to the setting information D3 on the basis of the user ID (see FIG. 5), which is associated with the user's fingerprint or the voice, and sets the volume, the microphone gain, and the frequency characteristic corresponding to the user.

The first acquisition processor 212 acquires the voice data that is collected by the microphone 24 installed in the microphone-speaker device 2. For example, in the conference room R1, the first acquisition processor 212 in the microphone-speaker device 2 of the user A acquires the voice data of the user A's speech that is collected by the microphone 24. In addition, in the case where the users E, F make conversation in the conference room R1, the first acquisition processor 212 in the microphone-speaker device 2 of the user A acquires voice data of speech of the users E, F that is collected by the microphone 24. Just as described, the first acquisition processor 212 acquires the user's speech or sound emitted by another sound source within a collection range of the microphone 24. The first acquisition processor 212 is an example of the first acquisition processor in the present disclosure.

The second acquisition processor 213 acquires the authentication information (fingerprint information) of the wearer who wears the microphone-speaker device 2, and such authentication information (fingerprint information) is acquired by the fingerprint sensor 23 installed in the microphone-speaker device 2. For example, the user A wears the microphone-speaker device 2 and connects (pairs) the microphone-speaker device 2 to (with) the voice processor 1. Thereafter, the user A touches the fingerprint sensor 23 with his/her finger. Once the fingerprint sensor 23 reads the user A's fingerprint, the second acquisition processor 213 acquires fingerprint information Fa of the user A. The second acquisition processor 213 is an example of the second acquisition processor in the present disclosure.

The identification processor 214 identifies (authenticates) the wearer of the microphone-speaker device 2 on the basis of the fingerprint information that is acquired by the second acquisition processor 213. More specifically, the identification processor 214 refers to, per user, the user information D2 (see FIG. 5), in which the identification information of the user (the user ID), the voice information of the user, and the fingerprint information of the user are associated with each other and stored, and identifies the wearer by the user ID that is associated with the fingerprint information acquired by the second acquisition processor 213. The identification processor 214 is an example of the identification processor in the present disclosure.

For example, in the case where the user A wears the microphone-speaker device 2A and touches the fingerprint sensor 23 with his/her finger, the identification processor 214 in the microphone-speaker device 2A acquires the fingerprint information Fa of the user A from the fingerprint sensor 23. The identification processor 214 refers to the user information D2 (see FIG. 5), and specifies (identifies) user ID "0001" that is associated with the fingerprint information Fa. The user ID "0001" corresponds to the user A.

In addition, for example, in the case where the user B wears the microphone-speaker device 2B and touches the fingerprint sensor 23 with his/her finger, the identification processor 214 in the microphone-speaker device 2B acquires fingerprint information Fb of the user B from the fingerprint sensor 23. The identification processor 214 refers to the user information D2 (see FIG. 5), and specifies (identifies) user ID "0002" that is associated with the fingerprint information Fb. The user ID "0002" corresponds to the user B.

Here, in the case where the fingerprint information that is acquired by the second acquisition processor 213 is not registered in the user information D2 (see FIG. 5), the identification processor 214 cannot identify the wearer. In this case, the controller 21 executes processing to register the fingerprint information, which is acquired by the second acquisition processor 213, in the user information D2. In addition to the registration of the fingerprint information, the controller 21 executes processing to register the voice information of the user. Accordingly, in the case where the user, who has not been registered in the user information D2 in advance by using the microphone-speaker device 2, wears and uses the microphone-speaker device 2, the user can perform the registration operation at such a time point to register the voice information and the fingerprint information.

The determination processor 215 determines whether the speech in the voice data, which is acquired by the first acquisition processor 212, matches the wearer's speech, which is identified by the identification processor 214. For example, in the case where the identification processor 214 identifies the user ID "0001" from the fingerprint information of the wearer, the determination processor 215 determines whether the voice information in the voice data of the wearer, which is acquired by the first acquisition processor 212, matches voice information Va that is associated with the user ID "0001". The determination processor 215 is an example of the determination processor in the present disclosure.

The determination processor 215 executes the determination processing (voice authentication) by a well-known voice recognition technique. For example, the determination processor 215 executes the voice authentication by using a technique such as a hidden Markov model, pattern matching, a neural network, or a decision tree.

Alternatively, the determination processor 215 may execute the voice authentication by using a learned model of the voice recognition. For example, the learned model may be generated by the microphone-speaker device 2 and stored in the storage 22. For example, the controller 21 in the microphone-speaker device 2 generates the learned model through machine learning by using the voice information of each of the users as learning data. Further alternatively, the controller 21 may generate the learned model by the machine learning with the voice information that is acquired when the user wearing the microphone-speaker device 2 faces the front and speaks, the voice information that is acquired when the user wearing the microphone-speaker device 2 faces to the left and speaks, and the voice information that is acquired when the user wearing the microphone-speaker device 2 faces to the right and speaks as the learning data.

As another embodiment, for example, the learned model may be generated by the voice processor 1 or the cloud server and stored in the microphone-speaker device 2. For example, the cloud server acquires the voice information of each of the users via the microphone-speaker device 2, and generates the learned model through the machine learning by using the respective voice information as the learning data. The cloud server transmits the generated learned model to the microphone-speaker device 2.

The output processor 216 determines whether to output the voice data, which is acquired by the first acquisition processor 212, on the basis of a determination result by the determination processor 215. More specifically, in the case where the speech in the voice data, which is acquired by the first acquisition processor 212, matches the speech of the wearer, which is identified by the identification processor 214, the output processor 216 outputs the voice data. On the other hand, in the case where the speech in the voice data, which is acquired by the first acquisition processor 212, does not match the speech of the wearer, which is identified by the identification processor 214, the output processor 216 does not output the voice data. In this case, the output processor 216 may discard the voice data. The output processor 216 is an example of the control processor in the present disclosure.

In the above example, in the case where the identification processor 214 specifies the user ID "0001" from the fingerprint information Fa of the wearer, and the voice information in the wearer's voice data, which is acquired by the first acquisition processor 212, matches the voice information Va associated with the user ID "0001", the output processor 216 outputs such voice data to the voice processor 1a. Meanwhile, for example, in the case where the identification processor 214 specifies the user ID "0001" from the fingerprint information Fa of the wearer, and the voice information in the wearer's voice data, which is acquired by the first acquisition processor 212, does not match the voice information Va associated with the user ID "0001", the output processor 216 does not output the voice data to the voice processor 1a.

Figure 7:
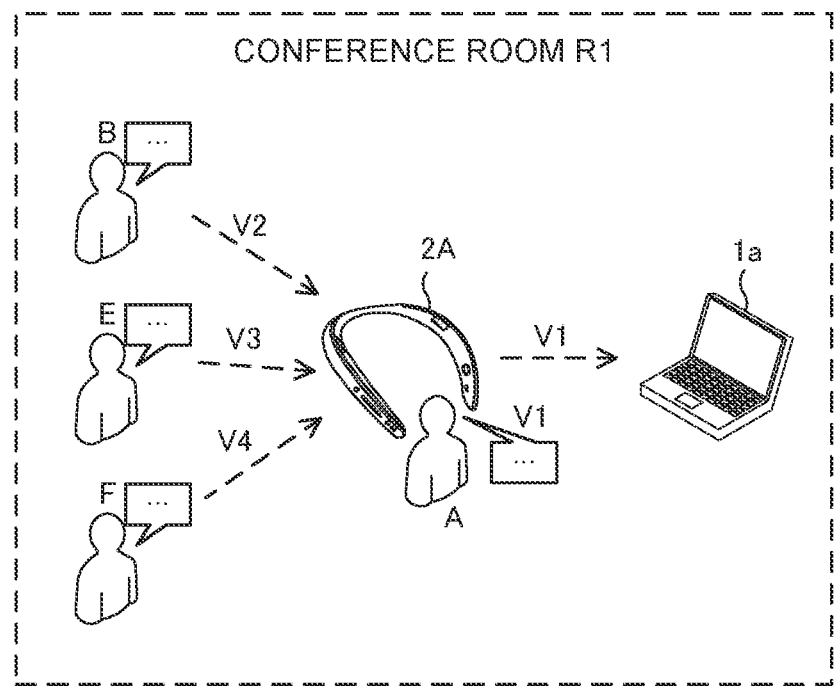
FIG. 7 is a view illustrating an example of outputting voice data in the conference system according to the embodiment of the present disclosure.

Just as described, only in the case where the voice information of the speech (the voice characteristic), which is acquired via the microphone 24, matches the voice information that corresponds to the wearer identified by the fingerprint information, the controller 21 outputs the voice data of the speech to the voice processor 1a. In other words, the controller 21 executes voice filter processing. Accordingly, for example, as illustrated in FIG. 7, in the case where the user A wears the microphone-speaker device 2A and the microphone-speaker device 2A acquires speech V1 of the user A, speech V2 of the user B, speech V3 of the user E, and speech V4 of the user F, the microphone-speaker device 2A only outputs voice data of the speech V1 of the user A as the wearer to the voice processor 1a, and cuts voice data of the speech V2, V3, V4 of the other users B, E, F. In this case, when having acquired the voice data of the speech V1, the voice processor 1a transmits the voice data to the conference server 3. Then, when having acquired the voice data, the conference server 3 transmits the voice data to the voice processor 1b in the conference room R2. When having acquired the voice data from the conference server 3, the voice processor 1b transmits the voice data to the microphone-speaker devices 2C, 2D. Then, when having acquired the voice data, the microphone-speaker devices 2C, 2D each output the speech V1 of the user A, which corresponds to the acquired voice data, from the speaker 25. In this way, the users C, D in the conference room R2 can clearly and only hear a speech content of the user A without speech contents of the other users B, E, F in the conference room R1 entering ears of the users C, D.

Voice Processor 1

As illustrated in FIG. 1, the voice processor 1 is an information processor that includes a controller 11, a storage 12, an operation display 13, a communicator 14, and the like. The voice processor 1 is not limited to a single computer but may be a computer system in which plural computers operate in cooperation. The voice processor 1 may be a personal computer, a smartphone, or the like.

The communicator 14 is a communicator that connects the voice processor 1 to a communication network N2 in either wired or wireless fashion to execute the data communication in accordance with the predetermined communication protocol with external devices such as the microphone-speaker devices 2 and the displays DP1, DP2 via the communication network N2. For example, the communicator 14 executes the pairing processing by the Bluetooth method, and is connected to the microphone-speaker device 2. In addition, when the online conference is held, the communicator 14 is connected to the communication network N1 (for example, the Internet), and executes the data communication between the plural sites (the conference rooms R1, R2).

The operation display 13 is a user interface that includes: a display, such as a liquid-crystal display or an organic EL display, that shows the various types of the information; and an operation acceptor, such as a mouse, a keyboard, or a touch panel, that accepts an operation.

The storage 12 is a non-volatile storage such as an HDD or an SSD that stores the various types of the information. The storage 12 also stores a control program such as a conference support program for causing the controller 11 to execute the conference support processing (see FIG. 8), which will be described below. For example, the conference support program may be recorded in the non-transitory manner on a computer-readable recording medium such as a CD or a DVD, read by a reader (not illustrated) such as a CD drive or a DVD drive provided to the voice processor 1, and then stored in the storage 12.

The controller 11 includes control devices such as a CPU, ROM, and RAM. The CPU is a processor that executes various types of calculation processing. The ROM is a non-volatile storage that stores, in advance, control programs such as BIOS and OS to cause the CPU to execute the various types of the calculation processing. The RAM is a volatile or non-volatile storage that stores the various types of the information, and is used as transitory storage memory (a working area) for various types of processing that are executed by the CPU. The controller 11 causes the CPU to execute the various control programs, which are stored in advance in the ROM or the storage 12, and thereby controls the voice processor 1.

For example, the controller 11 in the voice processor 1a, which is installed in the conference room R1, establishes a connection (pairing) with the microphone-speaker device 2 in the conference room R1, and exchanges the voice data with the microphone-speaker device 2. Similarly, the controller 11 in the voice processor 1b, which is installed in the conference room R2, establishes a connection (pairing) with the microphone-speaker device 2 in the conference room R2, and exchanges the voice data with the microphone-speaker device 2. In addition, when having acquired the voice data, the controller 11 in the voice processor 1a transmits the voice data to the conference server 3. When having acquired the voice data, the controller 11 in the voice processor 1b transmits the voice data to the conference server 3.

As another embodiment, the storage 12 in the voice processor 1 may store the user information D2 (see FIG. 5) and the setting information D3 (see FIG. 6). In addition, the controller 11 of the voice processor 1 may have functions as the identification processor 214 and the determination processor 215 (see FIG. 1) provided in the microphone-speaker device 2. In this case, the controller 11 may acquire the authentication information (the fingerprint information) from the microphone-speaker device 2 to identify the wearer, and may determine whether the speech in the voice data, which is acquired from the microphone-speaker device 2, is the speech made by the identified wearer.

Conference Support Processing

Figure 8:
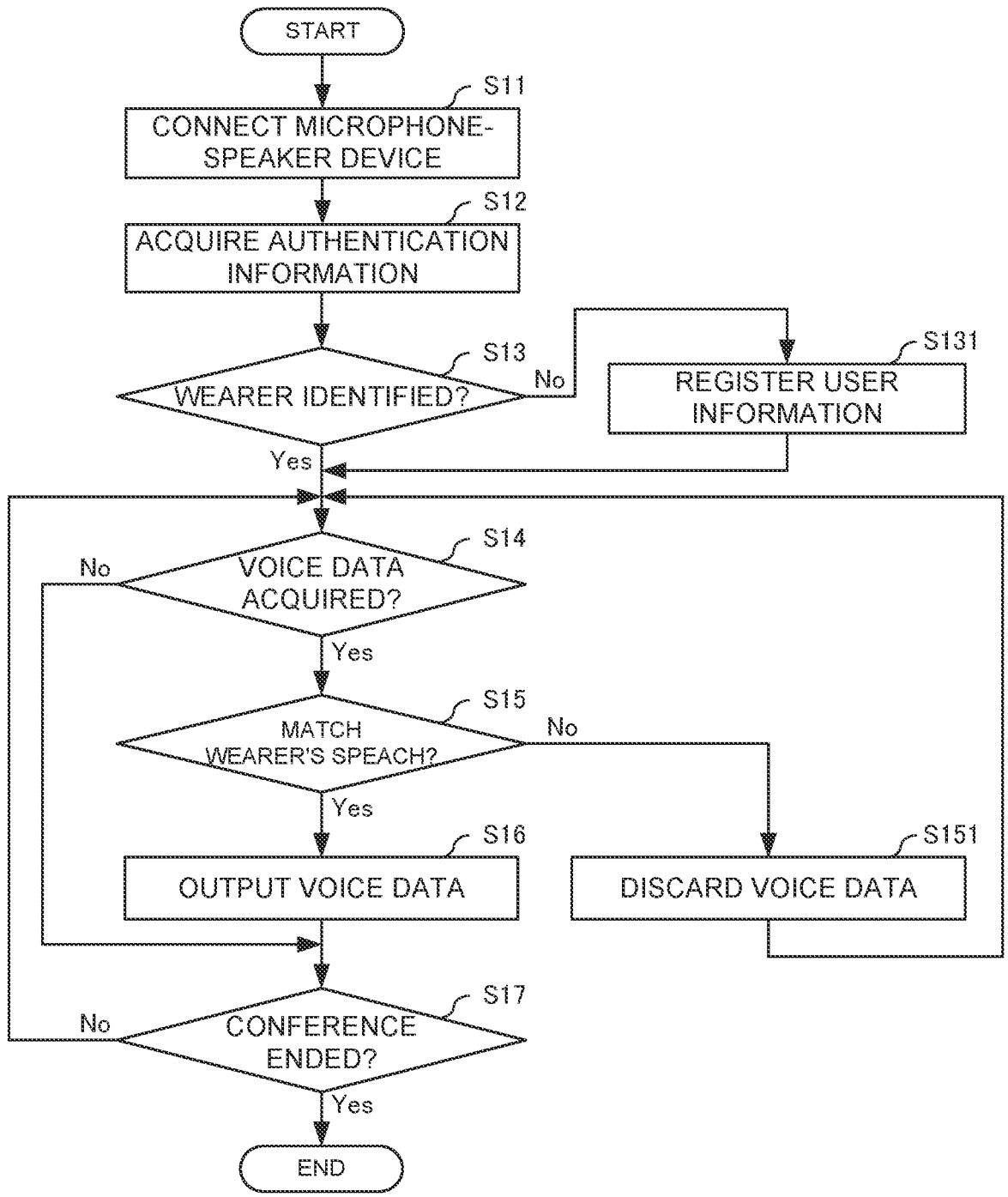
FIG. 8 is a flowchart for explaining an example of a procedure of conference support processing that is executed in the conference system according to the embodiment of the present disclosure.

A description will be made on an example of a procedure of the conference support processing that is executed by the controller 21 in the microphone-speaker device 2 with reference to FIG. 8. The present disclosure can be regarded as a disclosure of a conference support method (voice processing method in the present disclosure) in which one or plural steps included in the conference support processing are executed. The one or plural steps that are included in the conference support processing described herein may appropriately be omitted. In addition, an execution order of the steps in the conference support processing may be changed as long as the same or similar operational effects are exerted. Furthermore, a description will herein be made on a case where the controller 21 of the microphone-speaker device 2 executes each of the steps in the conference support processing as an example. However, in another embodiment, one or plural processors may separately execute the steps in the conference support processing.

A description will herein be made on the conference support processing that is executed by the particular single microphone-speaker device 2 included in the conference room R1.

First, in step S11, the controller 21 of the microphone-speaker device 2 connects the own microphone-speaker device 2 to the voice processor 1a. For example, when the user who participates in the conference presses the connection button 28 of the microphone-speaker device 2 worn by himself or herself, the controller 21 executes the pairing processing with the voice processor 1a by the Bluetooth method and connects the microphone-speaker device 2 to the voice processor 1a.

Next, in step S12, the controller 21 acquires the authentication information of the wearer of the microphone-speaker device 2. For example, when the user A touches the fingerprint sensor 23 of the microphone-speaker device 2A with his/her finger, the controller 21 acquires the fingerprint information Fa of the user A. Step S12 is an example of the second acquisition in the present disclosure.

Next, in step S13, the controller 21 determines whether the wearer of the microphone-speaker device 2 could have been identified. For example, if the fingerprint information Fa of the user A, which is acquired by the controller 21 in step S12, is registered in the user information D2 (see FIG. 5) (S13: Yes), the controller 21 identifies the wearer of the microphone-speaker device 2 as the user with the user ID "0001" (the user A). Thereafter, the processing proceeds to step S14.

On the other hand, if the fingerprint information of the wearer, which is acquired by the controller 21 in step S12, is not registered in the user information D2 (S13: No), the processing proceeds to step S131, and the controller 21 newly registers the fingerprint information in the user information D2. In this case, the controller 21 further acquires the voice of the wearer to associate the voice information with the fingerprint information, sets the user ID, and registers the user ID in the user information D2. Thereafter, the processing proceeds to step S14. Step S13 is an example of the identification in the present disclosure.

In step S14, the controller 21 determines whether the voice data of the speech made by the wearer of the microphone-speaker device 2 has been acquired. If the controller 21 has acquired the voice data (S14: Yes), the processing proceeds to step S15. On the other hand, if the controller 21 has not acquired the voice data (S14: No), the processing proceeds to step S17. Step S14 is an example of the first acquisition in the present disclosure.

In step S15, the controller 21 determines whether the speech in the voice data, which is acquired in step S14, matches the wearer's speech. For example, the controller 21 determines whether the voice information in the acquired voice data matches the voice information Va that is associated with the identified user ID "0001". If the voice information in the voice data, which is acquired by the controller 21, matches the voice information Va (S15: Yes), the processing proceeds to step S16. On the other hand, if the voice information in the voice data, which is acquired by the controller 21, does not match the voice information Va (S15: No), the processing proceeds to step S151.

In step S151, the controller 21 discards the voice data acquired in step S14. For example, in the case where the voice information in the acquired voice data is voice information Vc and does not match the voice information Va, which is associated with the user ID "0001", the controller 21 discards the voice data without outputting the voice data to the voice processor 1a.

In step S16, the controller 21 outputs the voice data, which is acquired in step S14, to the voice processor 1a. For example, in the case where the voice information in the acquired voice data is voice information Va and matches the voice information Va, which is associated with the user ID "0001", the controller 21 outputs the voice data to the voice processor 1a. Step S16 is an example of the control in the present disclosure.

Next, in step S17, the controller 11 determines whether the conference has been ended. For example, when the user performs an operation to end the online conference, the online conference is ended. If the online conference has been ended (S17: Yes), the controller 11 terminates the conference support processing. If the online conference has not been ended (S17: No), the processing proceeds to step S14. Then, the controller 21 repeats the above-described processing until the online conference is ended.

As it has been described so far, the conference system 100 is the system that exchanges the voice data of the user's speech via the wearable microphone-speaker device 2 worn by the user. The conference system 100 acquires the voice data that is collected by the microphone 24 installed in the microphone-speaker device 2. In addition, the conference system 100 acquires the authentication information (for example, the fingerprint information) of the wearer who wears the microphone-speaker device 2, and identifies the wearer on the basis of the acquired authentication information. The authentication information is acquired by the authentication information acquirer (for example, the fingerprint sensor 23) installed in the microphone-speaker device 2. Furthermore, the conference system 100 outputs the voice data in the case where the speech in the acquired voice data is the speech of the identified wearer. The conference system 100 does not output the voice data in the case where the speech in the acquired voice data is not the speech of the identified wearer.

According to the above configuration, in the case where the speech in the voice data acquired by the microphone-speaker device 2 matches the speech of the wearer of the microphone-speaker device 2, the voice data is output. Thus, the speech of the wearer of the microphone-speaker device 2 can be transmitted to the microphone-speaker device 2 on the other side. In addition, in the case where the speech in the voice data acquired by the microphone-speaker device 2 does not match the speech of the wearer of the microphone-speaker device 2, the voice data is discarded. Thus, it is possible to prevent the speech of the person other than the wearer of the microphone-speaker device 2 from being output from the microphone-speaker device 2 on the other side. In this way, it is possible to solve problems of uncomfortable feeling by the user on the other side in the conference and unsmooth conversation. Therefore, it is possible to improve the convenience of the microphone-speaker device 2.

The present disclosure is not limited to the above-described embodiment. A description will hereinafter be made on other embodiments of the present disclosure.

Figure 9:
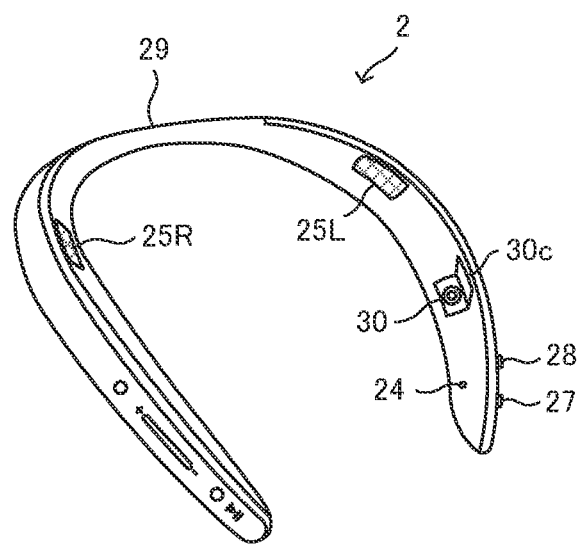
FIG. 9 is an external view illustrating another configuration of the microphone-speaker device according to the embodiment of the present disclosure.

In the above-described embodiment, the fingerprint information has been described as the example of the authentication information in the present disclosure. However, the authentication information in the present disclosure is not limited to the fingerprint information. As another embodiment, the authentication information in the present disclosure may be facial information of at least a part of the wearer's face. In this case, the authentication information acquirer in the present disclosure may include a camera 30 (imager) that captures the wearer's face. For example, the camera 30 captures an image of at least one of an ear or a mouth of the wearer. As illustrated in FIG. 9, in the microphone-speaker device 2, the camera 30 is arranged between the microphone 24 and the speaker 25 (for example, the speaker 25L) and on the inner side of the body 29. In addition, the camera 30 is arranged in the arm such that a camera lens faces obliquely upward and thus both of the ear and the mouth of the wearer are within an angle of view. In this case, the second acquisition processor 213 acquires an facial image of at least the part of the wearer's face. In the case where the wearer wears a mask, the controller 21 may provide voice guidance to remove the mask at the time of capturing the image of his/her mouth. In addition, in the case where the wearer's hair covers his/her ear and thus his/her ear cannot be authenticated, the controller 21 may provide voice guidance to pull his/her hair from his/her ear. The controller 21 uses a well-known authentication technique to identify the wearer from the image of the ear or the mouth captured by the camera 30. For example, the controller 21 identifies the wearer of the microphone-speaker device 2 by checking an ear shape extracted from the image of the wearer's ear against the ear shapes of the users registered in advance. For example, the controller 21 identifies the wearer of the microphone-speaker device 2 by checking a lip shape and lip motion extracted from the image of the wearer's mouth against the lip shapes and the lip motion of the users registered in advance.

The camera 30 may be provided with an openable/closable (flip-up) cover 30c for covering the lens. When the user pushes up the cover 30c with his/her finger, the cover 30c is opened, and the lens of the camera 30 is exposed (see FIG. 9).

As another embodiment, the authentication information in the present disclosure may be biometric information such as of the wearer's pulse (vein), retina, or voice (voiceprint). These types of the biometric information can be acquired by various sensors, the camera, or the like.

For example, the controller 21 may acquire the voice of the wearer of the microphone-speaker device 2 and identify the wearer of the microphone-speaker device 2 on the basis of the acquired voice. The controller 21 may execute the processing to identify the wearer (the authentication processing) for each of the voice that is acquired when the user faces the front and speaks, the voice that is acquired when the user faces to the left and speaks, and the voice that is acquired when the user faces to the right and speaks. In this case, the microphone 24 is an example of the authentication information acquirer in the present disclosure. In this way, the controller 21 can accurately identify the wearer by using the learned model that is generated on the basis of the voice information that is acquired when the user wearing the microphone-speaker device 2 faces the front and speaks, the voice information that is acquired when the user wearing the microphone-speaker device 2 faces to the left and speaks, and the voice information that is acquired when the user wearing the microphone-speaker device 2 faces to the right and speaks.

As another embodiment, the microphone-speaker device 2 may have a function of recording the voice data collected by the microphone 24. In the case where the speech in the voice data acquired by the first acquisition processor 212 does not match the wearer's speech identified by the identification processor 214, the setting processor 211 may set the higher microphone gain than the gain that is set when the speech matches the wearer's speech. In general, when the wearer of the microphone-speaker device 2 makes conversation with another user, the wearer's speech (the microphone gain) is loud and the partner's speech is low in the voice collected by the microphone 24. In regard to this point, according to the above configuration, by increasing the microphone gain of the partner's speech to be higher, the partner's speech can also be recorded reliably.

The voice processing system in the present disclosure is not limited to the conference system. As another embodiment, the voice processing system in the present disclosure may be applied to a voice recognition system, an interpretation system, or the like. More specifically, the voice processor 1 may provide an interpretation service to interpret the voice in the voice data in a first language into a second language when having acquired the voice data from the microphone-speaker device 2.

In regard to the voice processing system in the present disclosure, the microphone-speaker device 2 itself may constitute the voice processing system in the present disclosure, the voice processor 1 itself may constitute the voice processing system in the present disclosure, or a combination of the microphone-speaker device 2 and the voice processor 1 may constitute the voice processing system in the present disclosure.

The voice processing system in the present disclosure executes the predetermined processing related to the voice data on the basis of the authentication information of the user. As described above, the predetermined processing includes the processing to output the voice data when the speech in the acquired voice data matches the wearer's speech. The predetermined processing also includes the processing to set (adjust) the volume, the microphone gain, and the equalizer on the basis of the microphone 24 and the authentication information of the user, the processing to record the voice data collected by the microphone 24, the processing to interpret the voice, and the like.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voice processing system that exchanges voice data of a speech of a user via a microphone-speaker device, that is wearable and worn by the user, the voice processing system comprising:
a first acquisition processor that acquires the voice data collected by a microphone installed in the microphone-speaker device;
a second acquisition processor that acquires authentication information of a wearer who wears the microphone-speaker device, the authentication information being acquired by an authentication information acquirer installed in the microphone-speaker device;
a control processor that executes predetermined processing related to the voice data, which is acquired by the first acquisition processor, based on the authentication information acquired by the second acquisition processor;
an identification processor that identifies the wearer based on the authentication information acquired by the second acquisition processor; and
a setting processor that sets each of set values of a volume of a speaker and a gain of the microphone to a set value corresponding to the wearer identified by the identification processor, wherein
the microphone-speaker device stores the set values of the volume of the speaker and the gain of the microphone.

2. The voice processing system according to claim 1, wherein
the control processor outputs the voice data in a case that the speech of the user in the voice data acquired by the first acquisition processor matches a speech of the wearer identified by the identification processor.

3. The voice processing system according to claim 2, wherein
the control processor discards the voice data in a case that the speech of the user in the voice data acquired by the first acquisition processor does not match the speech of the wearer identified by the identification processor.

4. The voice processing system according to claim 1, wherein
the authentication information acquirer is a reader that reads a fingerprint of the wearer, and
the second acquisition processor acquires fingerprint information of the wearer.

5. The voice processing system according to claim 4, wherein
the microphone-speaker device includes:
a body with an annular structure in a top view,
an opening on a front side as seen from the wearer,
the microphone on an opening side, and
a speaker on a rear side of the wearer from the microphone, and
in the microphone-speaker device, the authentication information acquirer is arranged between the microphone and the speaker and in the body.

6. The voice processing system according to claim 1, wherein
the authentication information acquirer is an imager that captures an image of at least a part of a face of the wearer, and
the second acquisition processor acquires a facial image of at least the part of the face of the wearer.

7. The voice processing system according to claim 6, wherein
the imager captures the image of at least one of an ear and a mouth of the wearer.

8. The voice processing system according to claim 1, wherein
the authentication information acquirer is the microphone that collects a speech of the wearer, and
the second acquisition processor acquires the speech of the wearer.

9. The voice processing system according to claim 1, wherein
the identification processor refers to a storage that stores, per user, identification information of the user, voice information of the user, and authentication information of the user in association with each other, and the identification processor identifies the wearer by the identification information that is associated with the authentication information acquired by the second acquisition processor.

10. The voice processing system according to claim 9, wherein
when the acquired authentication information of the wearer is not stored in the storage, the second acquisition processor stores, in the storage, the authentication information, the voice information in the voice data of the wearer received by the first acquisition processor, and identification information of the wearer in association with each other.

11. The voice processing system according to claim 1, further comprising:
a determination processor that determines whether the speech of the user in the voice data acquired by the first acquisition processor matches a speech of the wearer identified by the identification processor.

12. The voice processing system according to claim 1, wherein
the microphone-speaker device has a function of recording the voice data that is collected by the microphone, and
in a case that the speech of the user in the voice data acquired by the first acquisition processor does not match a speech of the wearer identified by the identification processor, the setting processor sets the gain of the microphone to a higher set value than a gain of the microphone that is set when the speech of the user matches the speech of the wearer.

13. The voice processing system according to claim 1, wherein
the microphone-speaker device includes:
the first acquisition processor;
the second acquisition processor;
the identification processor; and
the control processor.

14. The voice processing system according to claim 1, wherein
the microphone-speaker device has a neckband shape.

15. A voice processing method for exchanging voice data of a speech of a user via a microphone-speaker device, that is wearable and worn by the user, the voice processing method comprising:
acquiring the voice data that is collected by a microphone installed in the microphone-speaker device;
acquiring authentication information of a wearer who wears the microphone-speaker device, the authentication information being acquired by an authentication information acquirer installed in the microphone-speaker device;
executing predetermined processing related to the acquired voice data based on basis of the authentication information;
identifying the wearer based on the authentication information;
setting each of set values of a volume of a speaker and a gain of the microphone to a set value corresponding to the identified wearer, wherein
the microphone-speaker device stores the set values of the volume of the speaker and the gain of the microphone.

* * * * *